Figure 1:
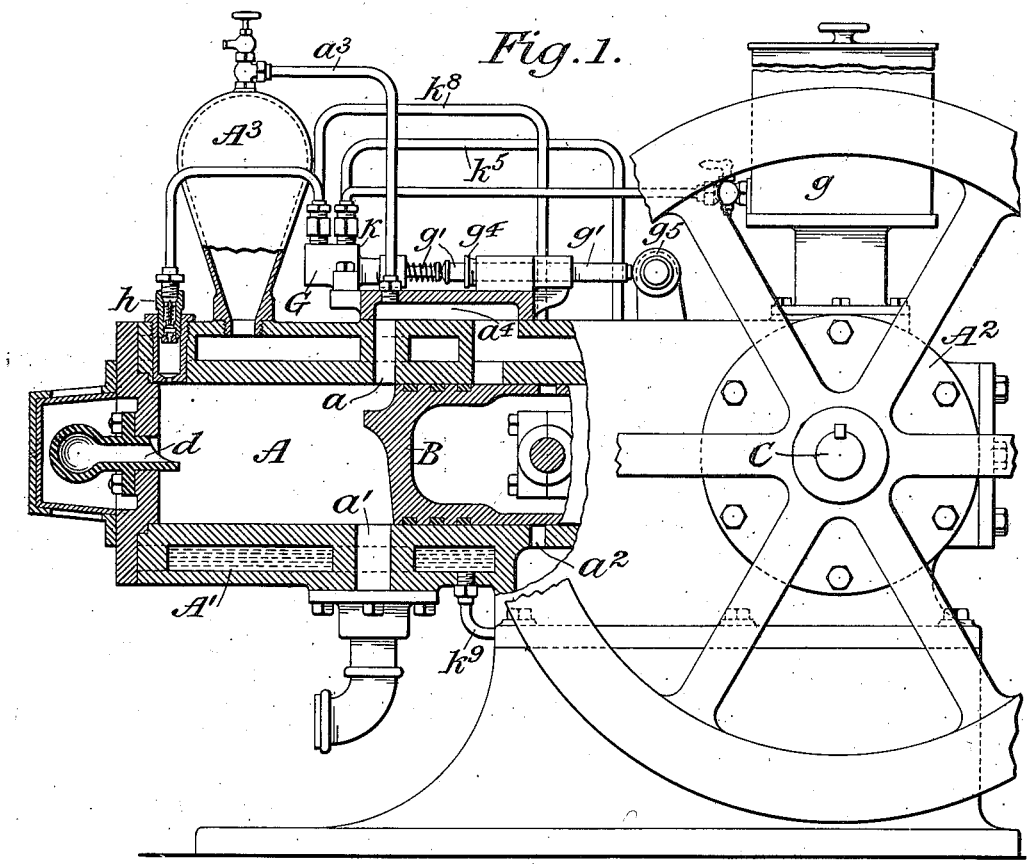

No. 861,411. PATENTED JULY 30, 1907.
C. W. WEISS.
INTERNAL COMBUSTION ENGINE.
APPLICATION FILED DEC. 12, 1903.

2 SHEETS—SHEET 1.

Attest:
A. N. Jesbera.
J. M. Scoble.

Inventor:
Carl W. Weiss
by Redding, Kiddle & Greeley
Attys.

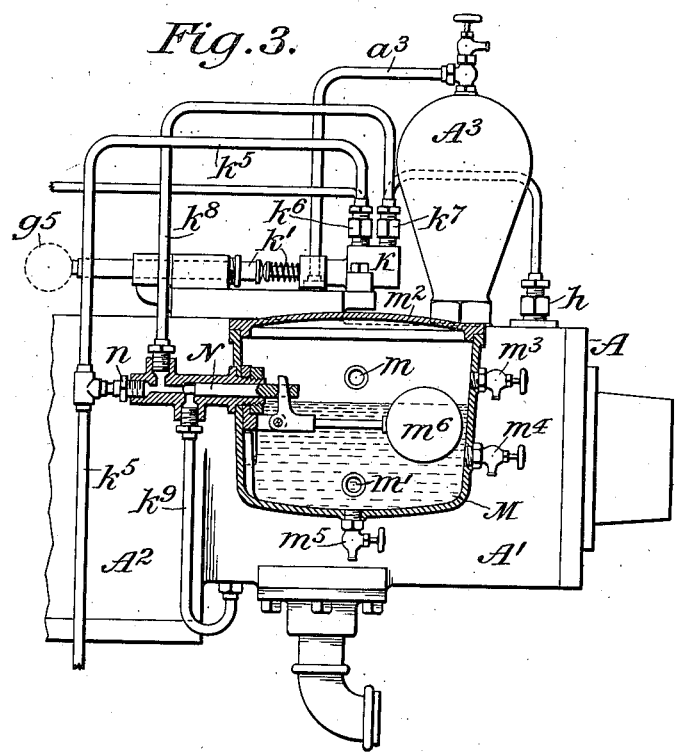

UNITED STATES PATENT OFFICE.

CARL W. WEISS, OF NEW YORK, N. Y.

INTERNAL-COMBUSTION ENGINE.

No. 861,411.　　　Specification of Letters Patent.　　　Patented July 30, 1907.

Application filed December 12, 1903. Serial No. 184,890.

*To all whom it may concern:*

Be it known that I, CARL W. WEISS, a citizen of the United States, residing in the borough of Brooklyn of the city of New York, in the State of New York, have invented certain new and useful Improvements in Internal-Combustion Engines, of which the following is a specification, reference being had to the accompanying drawings forming a part hereof.

This invention has for its object to increase the efficiency of internal combustion engines and relates more especially to the means for clearing out the exhaust from the working cylinder after each operation and to the means for maintaining in the explosion chamber or working cylinder the conditions best suited to the operation of the engine, particularly as regards the temperature of such chamber or cylinder.

For the purpose of clearing out the exhaust gases, maintaining in the cylinder the most favorable conditions, and improving the quality of the mixture, steam which is free from entrained water is introduced into the working cylinder.

It is highly desirable that the steam be free from water, first because with steam alone is it possible to attain with uniformity the conditions which have been found to be essential to the economical and satisfactory operation of internal combustion engines, whereas if water be introduced into the working cylinder and there evaporated the attainment of such uniform conditions is impossible, because of the uncertainty as to the amount of evaporation and as to the character of the explosive mixture. Furthermore, the tendency of water in the cylinder is to destroy combustion, and this tendency is largely obviated by the introduction of steam which is comparatively dry or free from water. Again, the introduction of steam into the working cylinder permits a relatively high and constant temperature to be maintained therein, whereas the introduction of water would reduce the temperature and would cause greater variation in temperature, by reason of the variation in the amount of evaporation. Moreover, it is found that the introduction of water destroys the lubrication of the piston in the cylinder and causes undue grinding and wearing of the piston in the cylinder, whereas the introduction of steam comparatively dry or free from water promotes lubrication and permits the engine to operate much longer than would otherwise be possible.

In the practical operation of the invention, therefore, provision is made for a constant supply of steam, comparatively dry or free from water, so that the steam may be introduced into the working cylinder at the proper instant in the cycle of operation of the engine and in regular and unvarying quantities, such steam being preferably supplied from the water jacket of the engine, in which the water is constantly renewed in proportion to the evaporation.

The invention will be more fully described hereinafter with reference to the accompanying drawings in which, for purposes of explanation, it is illustrated as embodied in an internal combustion engine which is in general of a well-known type.

Figure 2:
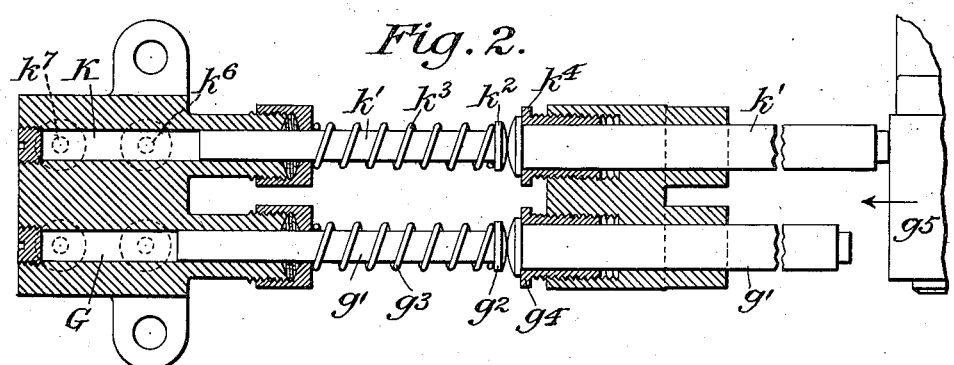

In the drawings—Figure 1 is a view partly in elevation and partly in longitudinal central section of so much of an engine as is necessary to illustrate the application of the invention thereto, some parts being broken away. Fig. 2 is a detail view in horizontal section and on a larger scale than Fig. 1, showing the construction and arrangement of the pumps. Fig. 3 is a detail view, partly in elevation from the opposite side of the engine shown in Fig. 1, and partly in vertical section, showing particularly the means for controlling and regulating the supply of water to the water-jacket of the engine. Fig. 4 is a detail view, partly in elevation and partly in vertical, central section, showing means for supplying steam from the water-jacket to the cylinder of a four-cycle engine.

As usual in engines of the type represented in Fig. 1 of the drawings, the working cylinder A is provided with a trunk-piston B connected by a pitman with a crank-shaft C while the crank-chamber $A^2$ is inclosed as usual to permit the compression by the forward stroke of the piston of the air required for the formation of each charge. The cylinder is also provided as usual with an inlet port $a$ communicating with the crank-chamber $A^2$ and arranged to be uncovered by the piston as it approaches the limit of its forward movement and an exhaust port $a'$ also arranged to be uncovered by the piston, preferably slightly in advance of the inlet port $a$. The cylinder is also provided, as usual, with an inlet port $a^2$ to admit air to the compression chamber $A^2$ as the piston approaches the limit of its rearward movement.

The working cylinder is provided, as usual, with a water-jacket $A'$ and provision is made whereby steam therefrom is admitted to the working cylinder, the steam connection being made at such a point that the steam will be admitted to the cylinder as the piston completes its forward stroke. It is desirable that the steam admitted to the cylinder shall carry with it as little entrained water as possible and accordingly a steam dome $A^3$ is mounted on the cylinder A and is connected with the top of the water-jacket. From the top of the steam dome a connection is made by a suitable pipe $a^3$ with the channel $a^4$ through which the air compressed in the compression chamber of the engine is delivered to the port $a$. Steam may therefore be drawn from the water-jacket through the steam dome into the crank-chamber during the compression stroke of the piston to be mingled with the air in the crank-chamber, and practically to fill the channel between the crank-chamber and the inlet port, so that when such port is open the major portion of the steam shall precede the air into the working cylinder, assisting in clearing out the exhaust gases, reducing to some extent the temperature in the working cylinder, and entering into the composition of the new charge. The main body of air from the crank-chamber follows the steam into the working chamber and is there mingled with the steam which remains in the working chamber and with the fuel basis of the new charge which in the meantime has been introduced into the working cylinder. During the return stroke of the piston the charge is compressed and ignition and expansion follow as usual.

Ignition may be effected in any suitable manner, an igniter of ordinary construction being represented at $d$. Provision is also made for the addition of cool water to the water-jacket in due proportion to compensate for the loss, by evaporation, of water in the water-jacket, such addition of cool water during the operation of the engine aiding in keeping the temperature of the working cylinder uniform and at a comparatively low degree, as is highly desirable in the operation of engines of this type. Furthermore, provision is made for the addition of the cool water to the water-jacket at such a point as to secure the most satisfactory results and for the control of the water supply according to the height of the water in the water-jacket without permitting the water to be heated before it enters the water-jacket. The cool water may be supplied under suitable pressure from any convenient source, the delivery of the water to the water-jacket being controlled by means hereinafter described. As represented in the drawings, the water is supplied by a pump arranged to be operated by the engine, the water pump being conveniently disposed in proximity to the usual fuel pump and arranged to be operated by the same means. As shown in the drawings, the fuel pump G is constructed and arranged as usual, having its inlet connected with a reservoir $g$ and its outlet connected with a suitable nozzle $h$ through which the oil is delivered to the working cylinder. The plunger $g'$ of the oil pump is provided with a collar $g^2$ for coöperation with a spring $g^3$ by which the plunger is returned to position, the throw of the plunger being limited by an adjustable stop $g^4$. The forward movement of the plunger may be effected as usual by a reciprocating part $g^5$ actuated in the usual manner from the crank-shaft C. The water pump K, which may be conveniently embodied in the same structure with the oil pump G, is similarly constructed, its plunger $k'$ being provided with a collar $k^2$ for coöperation with the spring $k^3$ to return the plunger, while the throw of the plunger is limited by an adjustable stop $k^4$. The intake of the pump is represented by the pipe $k^5$ which is connected with the cylinder of the pump through a check-valve $k^6$, and the discharge of the pump is connected through a check-valve $k^7$ and pipes $k^8$ and $k^9$ with the water jacket A' at a point near its forward end, preferably between the exhaust valve of the cylinder and the compression chamber, so that the forward portion of the cylinder shall receive from the incoming water the greatest cooling effect.

The cool water, whether supplied by the pump K or from any other suitable source, which may be indicated by the pipe $k^8$, is delivered directly to the water-jacket, and the delivery thereof is regulated by means which are controlled by the quantity of water in the water-jacket. For this purpose a tank M is secured to the side of the working cylinder and is connected with the water-jacket at two points, near its top and near its bottom, as at $m$ and $m'$. The tank has a tight cover $m^2$ and may be provided with pet cocks $m^3$ and $m^4$ and a drainage cock $m^5$. Within the tank is mounted a float $m^6$ which, rising or falling with the height of the water in the tank, which is the same as that in the water-jacket, controls a valve N which is interposed between the source of water supply and the water-jacket, as between the pipes $k^8$ and $k^9$, and regulates the delivery of water from the water supply $k^8$ to the water-jacket. Since, in the arrangement shown in Figs. 1, 2, and 3 of the drawings, the pump K continues to operate regardless of the height of the water in the water-jacket, it is desirable to provide a by-pass and to this end the chamber of the valve N may be connected as at $n$ with the supply pipe $k^5$ of the pump, so that when the valve N is closed, the water delivered through the pipe $k^8$ may be returned to the suction side of the pump.

In Fig. 4 of the drawings there is illustrated the application of the invention to a four-cycle engine. In this case modification of the structure already described is necessary only so far as concerns the delivery of the steam from the water-jacket to the working cylinder. There being no compression chamber independent of the working cylinder, the steam dome $A^3$ is connected by a pipe $a^5$ with the head of the working cylinder, through an inwardly opening valve $a^6$, so that during the suction stroke of the piston the valve $a^6$ is opened and steam is drawn from the steam dome directly into the cylinder, while during the working stroke, the scavenging stroke, and the compression stroke of the piston, the valve $a^6$ is held closed by the pressure in the cylinder. In other respects, as will be obvious, the construction of the parts involved in the present invention may be as shown in Figs. 1, 2 and 3.

So far as concerns the admission of steam to the working cylinder and the action of the steam therein, the nature of the invention has been fully explained. So, also, with respect to the means for maintaining a supply of water in the water-jacket, to compensate for the reduction of the quantity therein by evaporation, construction and arrangement of the several parts involved has been fully described. It will be understood that, the supply of cool water being maintained by the pump K or by other convenient means, the delivery of the cool water to the water-jacket is regulated by the float-valve, the operation of which is controlled by the height of the water in the water-jacket, so that as the quantity of water in the water-jacket is reduced below the normal the valve N will be opened and more water will be admitted and as soon as the water reaches the proper level in the water-jacket the valve N will be closed and the delivery of water to the water-jacket stopped. It will be observed that the water on its way to the water-jacket is not brought in contact with highly heated portions of the engine and consequently enters the water-jacket at such a comparatively low temperature as to be efficacious in reducing the temperature of the working cylinder and thereby promoting compression. Furthermore, since the tendency to heating of the cylinder is proportionate to the work done by the engine, and the rapidity with which the water in the water jacket is evaporated is in turn proportionate to the heating of the cylinder, and the inflow of cool water is determined by the rapidity of evaporation, it will be obvious that any rise in temperature of the cylinder will be quickly offset by a larger inflow of cool water so that the temperature of the working cylinder will be maintained practically uniform under all conditions, whether the engine be running under a heavy load or under a light load or idle. It is well understood that such uniformity in temperature of the working cylinder is an essential element in the continued operation of an internal combustion engine at its maximum efficiency and the value of means which permit such uniformity of temperature to be maintained under all conditions will be recognized. Again, the reduction of the temperature of the working cylinder to a desirable degree is promoted by the delivery of the cool water at the forward end of the water jacket, since the presence of cooler water in that portion of the water jacket assists materially in keeping down the temperature of the corresponding portion of the cylinder and the piston and consequently the forward parts of the engine, while the temperature of the explosion chamber is reduced least, as is desirable. Moreover, by feeding in the cool water at that portion of the working cylinder and water jacket which is at the relatively lowest temperature and discharging it at that portion which is at the highest temperature, the greatest difference in temperature between the cooling water and the working cylinder is secured with a consequent greater absorption of heat.

I claim as my invention:

1. In an internal combustion engine, the combination of a working cylinder and piston, said cylinder having an exhaust port and an inlet port arranged to be uncovered by the piston as it approaches the forward limit of its stroke, means to supply steam, relatively dry and cool, to said inlet port, and means to supply air under pressure to said inlet port, whereby as said ports are uncovered by the piston air and steam are admitted to the cylinder to clear out the exhaust, cool the cylinder, and form the basis of the succeeding charge, substantially as described.

2. In an internal combustion engine, the combination of a working cylinder and piston, said cylinder having an exhaust port and an inlet port arranged to be uncovered by the piston as it approaches the forward limit of its stroke, a closed crank chamber, means for supplying air thereto, a passage connecting said crank chamber with the air inlet port, and means to supply steam, relatively cool and dry to said passage, whereby as said ports are uncovered by the piston air and steam are admitted to the cylinder to clear out the exhaust, cool the cylinder, and form the basis of the succeeding charge, substantially as described.

3. In an internal combustion engine, the combination of a working cylinder and piston, said cylinder having an exhaust port and an inlet port arranged to be uncovered by the piston as it approaches the forward limit of its stroke, a water jacket about the cylinder, a steam dome connected with the upper part of said water jacket, a connection from said steam dome to said inlet port, and means to supply air under pressure to said inlet port, whereby as said ports are uncovered by the piston air and steam are admitted to the cylinder to clear out the exhaust, cool the cylinder, and form the basis of the succeeding charge, substantially as described.

4. In an internal combustion engine, the combination of a working cylinder and piston, said cylinder having an exhaust port and an air inlet port arranged to be uncovered by the piston as it approaches the forward limit of its stroke, a closed crank chamber, a passage connecting said crank chamber with said air inlet port, a water jacket about the cylinder, a steam dome communicating with the upper part of said water jacket, and a connection from said steam dome to said passage, whereby as said ports are opened air and steam are admitted to the cylinder to clear out the exhaust, cool the cylinder, and form the basis of the succeeding charge, substantially as described.

5. In an internal combustion engine, the combination of a working cylinder and piston, said cylinder having an exhaust port and an inlet port arranged to be uncovered by the piston as it approaches the forward end of its stroke, a water jacket about the cylinder, a steam dome connected with the upper part of said water jacket, a connection from said steam dome to said inlet port, means to supply air under pressure to said inlet port, a water supply connection direct to said water jacket and having an interposed valve, a closed tank communicating with said water jacket and independent of the water connection, and a float in said tank to control said valve, whereby the loss of water in the water jacket is compensated by the addition of water directly to the water jacket without passing the same through the tank, substantially as described.

6. In an internal combustion engine, the combination of a working cylinder and piston, said cylinder having an exhaust port and an inlet port arranged to be uncovered by the piston as it approaches the forward end of its stroke, a water jacket about the cylinder, a steam dome connected with the upper part of said water jacket, a connection from said steam dome to said inlet port, means to supply air under pressure to said inlet port, a pump operated by the engine to supply water to said jacket, a direct connection from said pump to said water jacket including a valve, a by-pass around said valve, a tank communicating with the water jacket and independent of the water supply connections, and a float in said tank to control said valve, whereby the loss of water in the water jacket is compensated by the addition of water directly to the water jacket without passing the same through the tank, substantially as described.

This specification signed and witnessed this tenth day of December A. D., 1903.

CARL W. WEISS.

In the presence of—
ANTHONY N. JESBERA,
M. A. BRAYLEY.